Patented Feb. 8, 1944

2,340,961

UNITED STATES PATENT OFFICE 2,340,961

METHOD OF SEPARATING SULPHUR DI-OXIDE AND CHLORINE FROM MIXTURES

Arthur W. Hixson, Leonia, N. J., and Ralph Miller, New York, N. Y., assignors to The Chemical Foundation, Incorporated, a corporation of Delaware, as trustee No Drawing. Application December 11, 1941, Serial No. 422,592

9 Claims. (Cl. 23—178)

This invention relates to a method of separating sulphur dioxide and chlorine from mixtures thereof.

As disclosed in copending application Serial No. 263,190, filed March 21, 1939, it has been found that chlorine and sodium sulphate may be produced from sodium chloride and sulphur by effective methods. As therein disclosed this may be accomplished in one method by converting sulphur to sulphur trioxide and contacting this, free from oxygen, with sodium chloride to form sodium chlorosulphonate which is then thermally decomposed to form sodium sulphate, chlorine and sulphur dioxide. In the complete operation the chlorine and sulphur dioxide are separated, the sulphur dioxide oxidized to sulphur trioxide which is recycled for reaction with additional quantities of salt. In a more specific sense the invention comprises the steps of oxidizing sulphur to sulphur dioxide, converting the latter to sulphur trioxide; cooling the sulphur trioxide and adsorbing it in oleum; heating the oleum to evolve sulphur trioxide; contacting the evolved sulphur trioxide with sodium chloride to form sodium chlorosulphonate, then thermally decomposing the sodium chlorosulphonate to form a gaseous mixture of sulphur dioxide and chlorine and solid sodium sulphate. In the prior application the gaseous mixture was separated into its components by certain described methods. In the present invention this separation of sulphur dioxide and chlorine is effected very simply by utilizing a reagent which forms an addition compound with sulphur dioxide.

In another method cholorsulphonic acid is reacted with sodium chloride to form sodium chloride to form sodium chlorosulphonate and gaseous hydrogen chloride. The chlorosulphonate is then thermally decomposed to form sodium sulphate, sulphur dioxide and chlorine. Here again the sulphur dioxide and chlorine are separated, the sulphur dioxide is oxidized to sulphur trioxide and reacted with hydrogen chloride to form chlorosulphonic acid which is then used to react with further amounts of salt.

According to a third method sulphur trioxide and sodium chloride are reacted at elevated temperatures to directly form sodium sulphate and a mixture of chlorine and sulphur dioxide. The sulphur dioxide and chlorine are then separated, the sulphur dioxide is oxidized to sulphur trioxide which is recycled in the process.

In each of these methods a step of major importance is the separation of chlorine and sulphur dioxide. In the earlier application the separation methods involved either low temperature or high pressure for liquefaction; this is rather undesirable in that it requires careful control and expensive equipment.

As a result of intensive experimentation it has been found that the separation of sulphur dioxide and chlorine from gaseous mixtures thereof may be effectuated in simple and efficient manner.

The invention comprehends the concept of separating sulphur dioxide and chlorine by selectively reacting the sulphur dioxide with a material with which it forms a solid addition compound and which material does not react with chlorine. The new method of separation may be carried out under relatively wide variations of temperature and pressure thus insuring its adaption to optimum conditions.

It has been discovered that zirconium tetrachloride is well suited to effect the described separation. This product, as is known, is a white powder which is quite hygroscopic. It has been ascertained that zirconium tetrachloride reacts with sulphur dioxide, in the presence of gaseous chlorine to form a direct solid addition compound. The addition reaction takes place at low temperatures of the order of 0° C. to about −10° C. or lower. The addition compound is thermally unstable, decomposing slowly at room temperatures and completely at 100° C. Fortuitously zirconium does not liquefy at elevated temperatures but sublimes at about 300° C. The addition reaction described is exothermic hence in carrying out the $SO_2$—$Cl_2$ separation it is desirable to cool or refrigerate the reaction so as to maintain the temperature at the low value favorable to the formation of the addition compound.

It will be appreciated from the foregoing that zirconium tetrachloride is well suited for the separation of sulphur dioxide from chlorine, and while this separation may be effected in liquid phase it is obviously preferable to carry out the operation in the gaseous phase. In carrying out the invention an equimolecular mixture of sulphur dioxide and chlorine produced by the reactions described hereinbefore is passed through suitable cooling apparatus to reduce its temperature down to the order of 0° C. to −10° C. or below. The cooled gas is then passed through a chamber containing the solid zirconium tetrachloride. Preferably the tetrachloride is distributed on plates or in inert material so as to permit free passage of the gaseous mixture therethrough under conditions insuring maximum contact of the gas with the solid absorbent material. The contact chamber containing the tetrachloride may be provided with cooling coils or other cooling means to absorb the exothermic heat of the reaction and maintain the optimum low temperature.

In the complete operative process it is desirable to utilize the tetrachloride to absorb the sulphur dioxide and to regenerate the tetrachloride for reuse. This may be accomplished by employing two or more towers through which the gas to be treated may alternately be passed. The cooled gaseous mixture, to be separated may be passed through one tower packed with zirconium tetrachloride in the manner described. In addition to the cooling means each tower may be provided with a heating means available for the decomposition of the addition compound. The gas is flowed through the first tower at such a rate that all the sulphur dioxide in the entering mixture reacts with zirconium tetrachloride. The chlorine, freed from sulphur dioxide is withdrawn from the tower and passed to a receiver.

When the zirconium tetrachloride in one tower is completely reacted and exhausted the flow of the entering gas is then diverted to a second tower of the battery in which the sulphur dioxide is reacted with the tetrachloride.

Pure sulphur dioxide may be passed through the first tower to sweep out any residual chlorine and this gas mixture may be passed to the second tower for fractionation therein.

When the first tower has been cleared of chlorine the addition compound is treated in situ to regenerate the zirconium tetrachloride. This may be done by warming the addition compound up to about 100° C. This heating drives off the combined $SO_2$ and regenerates the tetrachloride. The evolved $SO_2$ is discharged to a receiver and may again be utilized in the process by oxidation to sulphur trioxide which may be reacted with sodium chloride by any of the methods hereinbefore described. After driving off the $SO_2$ from the addition compound the first tower may be put back on stream. By this method of alternating the entering gas stream between two or more towers a substantially continuous operation may be carried out.

Of course it will be appreciated that if desired the spent tetrachloride, i. e., the addition compound may be passed to a separate unit for regeneration therein.

It is found in actual operations about 233 pounds of zirconium tetrachloride will combine with 64 pounds of sulphur dioxide at a temperature of —10° C. Due to the complete evolution of the $SO_2$ from the addition compound the tetrachloride is completely regenerated for reemployment and hence represents only an initial plant expenditure.

It will be appreciated that the described process is eminently simple and economical. The described process is given as illustrative of the utilization of materials having the characteristics of zirconium tetrachloride for the described separation.

We claim:

1. A method of separating sulphur dioxide and chlorine from a gaseous mixture of these components which comprises contacting the low temperature mixture with zirconium tetrachloride under conditions regulated to effect the formation of an addition compound of the zirconium tetrachloride and sulphur dioxide and recovering chlorine substantially free from sulphur dioxide.

2. A method of separating sulphur dioxide and chlorine from a mixture thereof which comprises contacting the mixture at low temperature with zirconium tetrachloride to form a non-gaseous addition compound of the zirconium tetrachloride and sulphur dioxide, separating chlorine and the addition compound and heating the addition compound to evolve the combined sulphur dioxide.

3. A method of separating sulphur dioxide and chlorine from a gaseous mixture thereof which comprises continuously contacting zirconium tetrachloride with a cooled flowing stream of the gaseous mixture to preferentially abstract the sulphur dioxide from the mixture by forming an addition compound of sulphur dioxide and the zirconium tetrachloride and continuously removing chlorine substantially free from sulphur dioxide.

4. A method of separating sulphur dioxide and chlorine from a gaseous mixture thereof which comprises, continuously contacting zirconium tetrachloride with a flowing stream of the gaseous mixture at a temperature below 0° C. to preferentially abstract the sulphur dioxide from the mixture by forming an addition compound of sulphur dioxide and the zirconium tetrachloride and continuously removing chlorine substantially free from sulphur dioxide.

5. A method of separating sulphur dioxide and chlorine from a gaseous mixture thereof which comprises, continuously contacting zirconium tetrachloride with a flowing stream of the gaseous mixture maintained at a temperature below 0° C. to form a non-gaseous addition compound of sulphur dioxide and the zirconium tetrachloride continuously removing chlorine substantially free from sulphur dioxide, thermally decomposing the addition compound to form sulphur dioxide and zirconium tetrachloride and reemploying the regenerated zirconium tetrachloride in the process.

6. The process of producing chlorine and sodium sulphate comprising, burning sulphur-containing material to form sulphur dioxide; oxidizing to sulphur dioxide to sulphur trioxide; cooling the sulphur trioxide and absorbing it in oleum; heating the oleum to evolve sulphur trioxide; contacting the so formed sulphur trioxide with sodium chloride to form sodium chlorosulphonate; thermally decomposing the sodium chlorosulphonate to form a gaseous mixture of chlorine, and sulphur dioxide and solid sodium sulphate, separating the solid sodium sulphate from the gaseous mixture, contacting the gaseous mixture with zirconium tetrachloride under conditions regulated to form an addition compound of sulphur dioxide and the tetrachloride; separating gaseous chlorine from the solid addition compound; thermally decomposing the solid addition compound to form sulphur dioxide and regenerated zirconium tetrachloride; oxidizing the recovered sulphur dioxide to sulphur trioxide for recycling in the process and reemploying the regenerated zirconium tetrachloride for separation of sulphur dioxide from its mixture with chlorine.

7. A method of separating sulphur dioxide and chlorine from a gaseous mixture of these components which comprises cooling the mixture to a temperature of the order of from approximately 0° C. to —10° C., contacting the mixture with zirconium tetrachloride to effect the formation of an addition compound of the tetrachloride and sulphur dioxide and recovering chlorine substantially free from sulphur dioxide.

8. A method of separating sulphur dioxide and chlorine from a gaseous mixture of these components which comprises contacting the mixture with zirconium tetrachloride while maintaining the mixture at a temperature below about 0° C. to effect the formation of an addition compound of the tetrachloride and sulphur dioxide and withdrawing the unreacted chlorine substantially free from sulphur dioxide.

9. In the method of producing sodium sulphate and chlorine from sodium chloride that improvement which comprises, reacting sulphur trioxide with sodium chloride under conditions regulated to form solid sodium sulphate and a gaseous mixture of chlorine and sulphur dioxide in substantially equimolecular proportions, removing the gaseous mixture from the solid products of the reaction, contacting the gaseous mixture with zirconium tetrachloride to form a solid addition compound of the tetrachloride and the sulphur dioxide thermally decomposing the compound to form sulphur dioxide and regenerated zirconium tetrachloride, mixing the recovered sulphur dioxide with air and under conditions regulated to oxidize the sulphur dioxide to sulphur trioxide, absorbing the sulphur trioxide thus formed in sulphuric acid to produce oleum, heating the resulting oleum to recover undiluted sulphur trioxide and reacting the produced sulphur trioxide with additional sodium chloride in the first reaction stage for the continued production of sodium sulphate, sulphur dioxide and chloride.

ARTHUR W. HIXSON.
RALPH MILLER.